US012270356B2

(12) United States Patent
Winkler et al.

(10) Patent No.: US 12,270,356 B2
(45) Date of Patent: Apr. 8, 2025

(54) THRUST REVERSER CASCADE WITH ONE OR MORE FLOW DISRUPTERS

(71) Applicant: Rohr, Inc., Chula Vista, CA (US)

(72) Inventors: Julian Winkler, Glastonbury, CT (US); Wentaur E. Chien, San Diego, CA (US); Xiaolan Hu, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 17/878,531

(22) Filed: Aug. 1, 2022

(65) Prior Publication Data

US 2024/0035429 A1 Feb. 1, 2024

(51) Int. Cl.
| F02K 1/72 | (2006.01) |
| F02K 1/50 | (2006.01) |
| F02K 1/54 | (2006.01) |
| F02K 1/56 | (2006.01) |
| F02K 1/60 | (2006.01) |
| F02K 1/62 | (2006.01) |
| F02K 1/64 | (2006.01) |

(Continued)

(52) U.S. Cl.
CPC .................. *F02K 1/72* (2013.01); *F02K 1/50* (2013.01); *F02K 1/54* (2013.01); *F02K 1/56* (2013.01); *F02K 1/60* (2013.01); *F02K 1/62* (2013.01); *F02K 1/64* (2013.01); *F02K 1/68* (2013.01); *F02K 1/70* (2013.01); *F05D 2220/323* (2013.01); *F05D 2240/129* (2013.01)

(58) Field of Classification Search
CPC ..... F02K 1/32; F02K 1/50; F02K 1/54; F02K 1/56; F02K 1/64; F02K 1/68; F02K 1/70; F02K 1/72; F02K 1/76; F02K 1/60
See application file for complete search history.

(56) References Cited

U.S. PATENT DOCUMENTS

| 3,721,314 A | 3/1973 | Hoch |
| 3,779,010 A * | 12/1973 | Chamay ................... F02K 1/72 |
| | | 239/265.31 |

(Continued)

FOREIGN PATENT DOCUMENTS

| GB | 2550353 A | 11/2017 |
| WO | 2009029401 A2 | 3/2009 |

(Continued)

OTHER PUBLICATIONS

EP Search Report for EP Patent Application No. 23189023.7 dated Jan. 4, 2024.

*Primary Examiner* — Kyle Robert Thomas
(74) *Attorney, Agent, or Firm* — Getz Balich LLC

(57) ABSTRACT

An apparatus is provided for an aircraft propulsion system. This apparatus includes a cascade structure including a thrust reverser cascade and a flow disruptor. The thrust reverser cascade extends longitudinally between a cascade forward end and a cascade aft end. The thrust reverser cascade extends laterally between a cascade first side and a cascade second side. The thrust reverser cascade extends radially between an inner face and an outer face. The thrust reverser cascade includes a plurality of vanes arranged in a longitudinally extending array along the inner face. The flow disruptor is arranged at the cascade inner face and forward of the vanes. The flow disruptor is configured to disrupt boundary layer air flowing towards the vanes.

19 Claims, 14 Drawing Sheets

(51) Int. Cl.
  *F02K 1/68* (2006.01)
  *F02K 1/70* (2006.01)

(56) References Cited

U.S. PATENT DOCUMENTS

| | | | | |
|---|---|---|---|---|
| 3,863,867 | A | * | 2/1975 | Souslin .................... F02K 1/11 |
| | | | | 239/265.29 |
| 4,030,290 | A | | 6/1977 | Stachowiak |
| 4,671,460 | A | | 6/1987 | Kennedy |
| 4,894,985 | A | | 1/1990 | Dubois |
| 5,058,837 | A | * | 10/1991 | Wheeler ................ B64C 23/06 |
| | | | | 244/200.1 |
| 5,090,197 | A | * | 2/1992 | Dubois .................... F02K 1/70 |
| | | | | 239/265.29 |
| 5,097,662 | A | * | 3/1992 | Vieth ....................... F02K 1/70 |
| | | | | 239/265.29 |
| 5,347,808 | A | | 9/1994 | Standish |
| 6,029,439 | A | | 2/2000 | Gonidec |
| 6,151,883 | A | * | 11/2000 | Hatrick ................... F15D 1/12 |
| | | | | 239/265.29 |
| 6,402,092 | B1 | | 6/2002 | Jean |
| 6,427,801 | B1 | | 8/2002 | Dugan |
| 8,127,529 | B2 | * | 3/2012 | Pero ........................ F02K 1/70 |
| | | | | 60/230 |
| 8,484,944 | B2 | | 7/2013 | Urban |
| 8,783,010 | B2 | * | 7/2014 | Guillois ................ F02K 1/763 |
| | | | | 239/265.29 |
| 9,068,532 | B2 | | 6/2015 | Gormley |
| 9,086,034 | B2 | | 7/2015 | Aten |
| 9,371,799 | B2 | * | 6/2016 | Packard .................... F02K 3/00 |
| 9,719,466 | B2 | | 8/2017 | Nakhjavani |
| 9,765,729 | B2 | * | 9/2017 | Aten ...................... F02K 1/625 |
| 9,915,226 | B2 | | 3/2018 | Gormley |
| 9,970,387 | B2 | * | 5/2018 | Frank .................. F02K 1/763 |
| 10,184,426 | B2 | | 1/2019 | Schrell |
| 10,337,454 | B2 | | 7/2019 | Smith |
| 10,556,672 | B2 | | 2/2020 | Paolini |
| 10,590,885 | B2 | | 3/2020 | Acheson |
| 10,598,127 | B2 | | 3/2020 | Wadsworth |
| 10,794,328 | B2 | | 10/2020 | Gormley |
| 10,837,404 | B2 | | 11/2020 | Aziz |
| 11,028,801 | B2 | * | 6/2021 | Bourdeau ................ F02K 1/72 |
| 11,053,887 | B2 | | 7/2021 | Gormley |
| 2008/0072571 | A1 | | 3/2008 | Beardsley |
| 2010/0257841 | A1 | * | 10/2010 | Pero ........................ F02K 1/70 |
| | | | | 60/226.3 |
| 2012/0036716 | A1 | | 2/2012 | Urban |
| 2013/0056554 | A1 | * | 3/2013 | Guillois ................ F02K 1/763 |
| | | | | 239/265.19 |
| 2014/0027536 | A1 | * | 1/2014 | Gormley ................ F02K 1/70 |
| | | | | 239/265.19 |
| 2015/0267643 | A1 | | 9/2015 | Gonidec |
| 2016/0230702 | A1 | | 8/2016 | Charron |
| 2016/0243806 | A1 | | 8/2016 | Frost |
| 2016/0341150 | A1 | | 11/2016 | Chuck |
| 2017/0009704 | A1 | | 1/2017 | Dong |
| 2017/0058828 | A1 | | 3/2017 | Dong |
| 2017/0058829 | A1 | | 3/2017 | Dong |
| 2017/0335771 | A1 | | 11/2017 | Post |
| 2020/0003152 | A1 | | 1/2020 | Gormley |
| 2020/0025138 | A1 | | 1/2020 | Bourdeau |
| 2022/0112864 | A1 | | 4/2022 | Chilukuri |
| 2022/0220925 | A1 | | 7/2022 | Jodet |
| 2022/0268237 | A1 | | 8/2022 | Chilukuri |

FOREIGN PATENT DOCUMENTS

| | | |
|---|---|---|
| WO | 2020224886 A1 | 11/2020 |
| WO | 2020224888 A1 | 11/2020 |
| WO | 2020224889 A1 | 11/2020 |

* cited by examiner

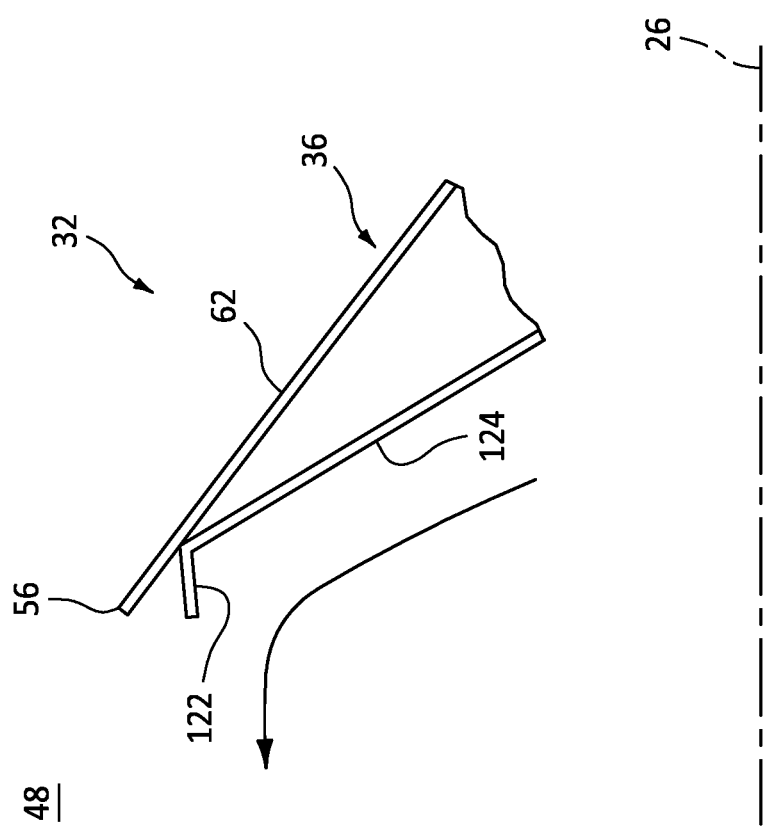

THRUST REVERSER CASCADE WITH ONE OR MORE FLOW DISRUPTERS

BACKGROUND

1. Technical Field

This disclosure relates generally to an aircraft propulsion system and, more particularly, to a thrust reverser for the aircraft propulsion system.

2. Background Information

An aircraft propulsion system with a turbofan or turbojet gas turbine engine may be configured with a thrust reverser system. The thrust reverser system is configured to redirect gas flowing within the aircraft propulsion system outward of the aircraft propulsion system and generally forward to produce reverse thrust. Various types and configurations of thrust reverser systems are known in the art. While these known thrust reverser systems have various benefits, there is still room in the art for improvement.

SUMMARY OF THE DISCLOSURE

According to an aspect of the present disclosure, an apparatus is provided for an aircraft propulsion system. This apparatus includes a cascade structure including a thrust reverser cascade and a flow disruptor. The thrust reverser cascade extends longitudinally between a cascade forward end and a cascade aft end. The thrust reverser cascade extends laterally between a cascade first side and a cascade second side. The thrust reverser cascade extends radially between an inner face and an outer face. The thrust reverser cascade includes a plurality of vanes arranged in a longitudinally extending array along the inner face. The flow disruptor is arranged at the cascade inner face and forward of the vanes. The flow disruptor is configured to disrupt boundary layer air flowing towards the vanes.

According to another aspect of the present disclosure, another apparatus is provided for an aircraft propulsion system. This apparatus includes a cascade structure including a thrust reverser cascade and a groove. The thrust reverser cascade extends longitudinally between a cascade forward end and a cascade aft end. The thrust reverser cascade extends laterally between a cascade first side and a cascade second side. The thrust reverser cascade extends radially between an inner face and an outer face. The thrust reverser cascade includes a plurality of vanes distributed along the inner face. The groove is disposed forward of the vanes. The groove extends radially into the cascade structure from the inner face.

According to still another aspect of the present disclosure, another apparatus is provided for an aircraft propulsion system. This apparatus includes a cascade structure including a thrust reverser cascade and a fence. The thrust reverser cascade extends longitudinally between a cascade forward end and a cascade aft end. The thrust reverser cascade extends laterally between a cascade first side and a cascade second side. The thrust reverser cascade extends radially between an inner face and an outer face. The thrust reverser cascade includes a plurality of vanes distributed along the inner face. The fence is disposed forward of the vanes. The fence extends radially out from the inner face to a distal end. The fence extends laterally along the thrust reverser cascade.

The groove may be disposed at the cascade forward end.

The groove may extend laterally along an entire lateral length of the thrust reverser cascade.

The groove may be configured with a polygonal cross-sectional geometry.

The flow disruptor may be configured as or otherwise include a groove that extends radially into the cascade structure from the inner face.

The flow disruptor may be configured as or otherwise include a protrusion that extends radially out form the inner face to a distal end.

The flow disruptor may be disposed at a leading edge of a ramp into the thrust reverser cascade.

The flow disruptor may be disposed at the cascade forward end.

The flow disruptor may extend laterally along the thrust reverser cascade.

The cascade structure may also include a second flow disruptor. The second flow disruptor may be arranged at the cascade inner face, forward of the vanes and laterally adjacent the flow disruptor.

A longitudinal distance between the flow disruptor and a first of the vanes may be constant as the flow disruptor extends laterally along the thrust reverser cascade.

A longitudinal distance between the flow disruptor and a first of the vanes may change as the flow disruptor extends laterally along the thrust reverser cascade.

The vanes may include a first vane, a second vane and a third vane. The first vane may be longitudinally spaced from the second vane by a first distance. The second vane may be longitudinally between and neighbor the first vane and the third vane. The second vane may be longitudinally spaced from the third vane by a second distance that is different than the first distance.

The first vane may be forward of the second vane. The third vane may be aft of the second vane. The second distance may be less than the first distance.

The inner face may be angularly offset from the outer face.

The thrust reverser cascade may radially taper as the thrust reverser cascade extends longitudinally between the cascade forward end and the cascade aft end.

The apparatus may also include a pivoting door thrust reverser system that includes the cascade structure.

The apparatus may also include a propulsion system structure that includes a flowpath and a thrust reverser system. The flowpath may extend within the propulsion system structure to an exhaust nozzle. The thrust reverser system may include the thrust reverser cascade. The thrust reverser cascade may be exposed to the flowpath when the thrust reverser system is stowed.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIG. 13 is a partial sectional illustration of one of the thrust reverser doors with a kicker frame.

DETAILED DESCRIPTION

Figure 1:
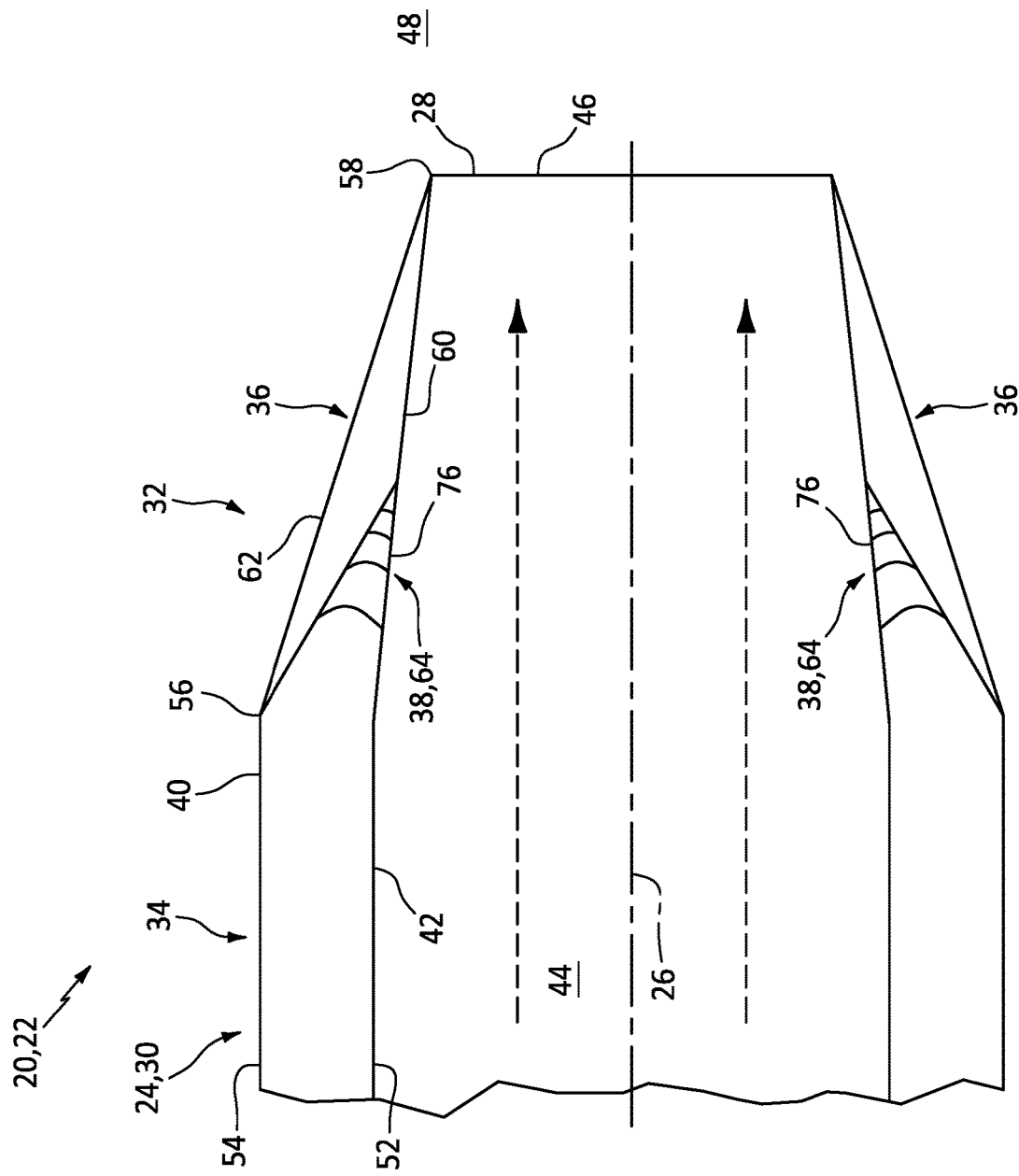
FIG. 1 is a side sectional schematic illustration of an aft section of an aircraft propulsion system with its thrust reverser stowed.
Figure 2:
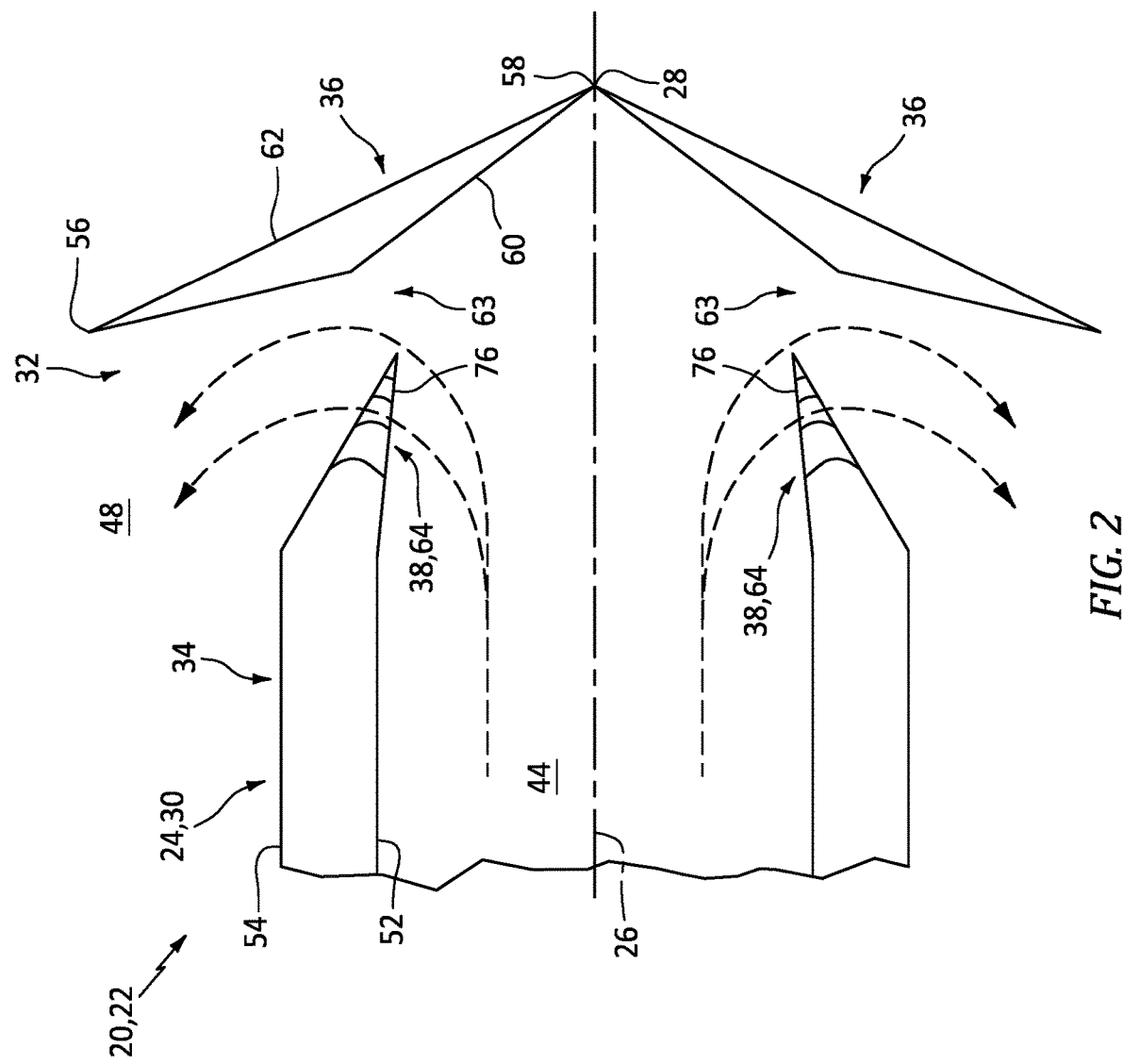
FIG. 2 is a side sectional schematic illustration of the aft section of the aircraft propulsion system of FIG. 1 with its thrust reverser doors deployed.

FIGS. 1 and 2 illustrate an aft section 20 of a propulsion system 22 for an aircraft such as, but not limited to, a commercial airliner or cargo plane. This aircraft propulsion system 22 includes a nacelle 24 and a gas turbine engine (not visible in FIGS. 1 and 2). The gas turbine engine may be configured as a turbojet gas turbine engine or a turbofan gas turbine engine; however, the present disclosure is not limited to such exemplary engine configurations.

The nacelle 24 is configured to house and provide an aerodynamic cover for the gas turbine engine. The nacelle 24 extends axially along an axial centerline 26 of the aircraft propulsion system 22 to a downstream, aft end 28 of the nacelle 24. The nacelle 24 of FIGS. 1 and 2 includes a nacelle aft structure 30 (a structure of the aircraft propulsion system 22) configured with a thrust reverser system 32. This thrust reverser system 32 is configured as a pivoting door thrust reverser system. More particularly, the thrust reverser system 32 may be configured as a target-type thrust reverser system. The term "target-type" may describe a pivoting door thrust reverser system that redirects a hot gas stream (e.g., a core gas stream) exhausted from the gas turbine engine, or both an outer cold gas stream (e.g., a bypass gas stream) and an inner hot gas stream (e.g., a core gas stream) exhausted from the gas turbine engine. It is contemplated, however, the thrust reverser system 32 may alternatively be configured as a clamshell-type thrust reverser system. The term "clamshell-type" may describe a pivoting door thrust reverser system that redirects an outer cold gas stream exhausted from the gas turbine engine, but not an inner hot gas stream exhausted from the gas turbine engine.

The aft structure 30 of FIGS. 1 and 2 includes a fixed structure 34, one or more (e.g., an opposing pair of) thrust reverser doors 36 and one or more cascade structures 38. Referring to FIG. 1, the aft structure 30 and its components (e.g., 34 and 36) are configured to form an aft portion of an outer aerodynamic flow surface 40 of the nacelle 24. The aft structure 30 and its components (e.g., 34, 36 and 38) are configured to form an aft portion of an inner aerodynamic flow surface 42 of the nacelle 24. This aft portion of the inner aerodynamic flow surface 42 forms an outer peripheral boundary of an aft-most portion of a flowpath 44 within the aircraft propulsion system 22. This aft-most portion of the flowpath 44 receives a gas flow (e.g., core gas and/or bypass air) from the upstream gas turbine engine. The aft-most portion of the flowpath 44 extends axially along the axial centerline 26 within the aircraft propulsion system 22 and its aft structure 30 to an annular trailing edge of an exhaust nozzle 46, at which point the flowpath 44 of FIG. 1 meets an exterior environment 48 surrounding the aircraft propulsion system 22. This exhaust nozzle 46 may be at least partially or completely formed by the thrust reverser doors 36 as shown in FIG. 1. Alternatively, referring to FIGS. 3 and 4, an aft portion 50 of the fixed structure 34 (or another standalone nozzle structure) may at least partially or completely form the exhaust nozzle 46. With such an arrangement, the thrust reverser system 32 may be termed a "pre-exit" thrust reverser system.

The fixed structure 34 of FIG. 1 extends axially along the axial centerline 26 to a downstream, aft end of the fixed structure 34. The fixed structure 34 extends radially between and to a radial inner side 52 of the fixed structure 34 and a radial outer side 54 of the fixed structure 34. The structure inner side 52 may partially form the inner aerodynamic flow surface 42. The structure outer side 54 may partially form the outer aerodynamic flow surface 40. The fixed structure 34 extends circumferentially about (e.g., completely around) the axial centerline 26, thereby providing the fixed structure 34 with, for example, a tubular body.

The thrust reverser doors 36 are arranged circumferentially about (e.g., on opposing sides of) the axial centerline 26. The thrust reverser doors 36 are moveably (e.g., pivotally) attached to the fixed structure 34. The thrust reverser doors 36 may thereby move (e.g., pivot) between a stowed, closed position (e.g., see FIGS. 1 and 3) and a deployed, open position (e.g., see FIGS. 2 and 4).

When in the stowed position of FIG. 1 (see also FIG. 3), each of the thrust reverser doors 36 extends axially along the axial centerline 26 between a forward end 56 of the respective thrust reverser door 36 and an aft end 58 of the respective thrust reverser door 36. Each of the thrust reverser doors 36 extends radially between and to a radial inner side 60 of the respective thrust reverser door 36 and a radial outer side 62 of the respective thrust reverser door 36. The door inner side 60 may partially form the inner aerodynamic flow surface 42. The door outer side 62 may partially form the outer aerodynamic flow surface 40. Each of the thrust reverser doors 36 extends circumferentially about (e.g., partially around) the axial centerline 26 providing the respective thrust reverser door 36 with an arcuate (e.g., partially conical) body.

Each of the stowed thrust reverser doors 36 of FIG. 1 (see also FIG. 3) may axially overlap/cover one or more of the cascade structures 38 and/or an aft portion of the fixed structure 34. By covering the cascade structures 38, the thrust reverser doors 36 may generally prevent gas from flowing radially outward through the cascade structures 38 from the flowpath 44. The gas exhausted from the gas turbine engine may thereby flow (e.g., unobstructed) through the flowpath 44 and out of the aircraft propulsion system 22 through the exhaust nozzle 46. By contrast, when deployed to the deployed position of FIG. 2 (see also FIG. 4), the thrust reverser doors 36 move (e.g., pivot) outward into the exterior environment 48 outside of the aircraft propulsion system 22 and downward into the flowpath 44.

Figure 4:
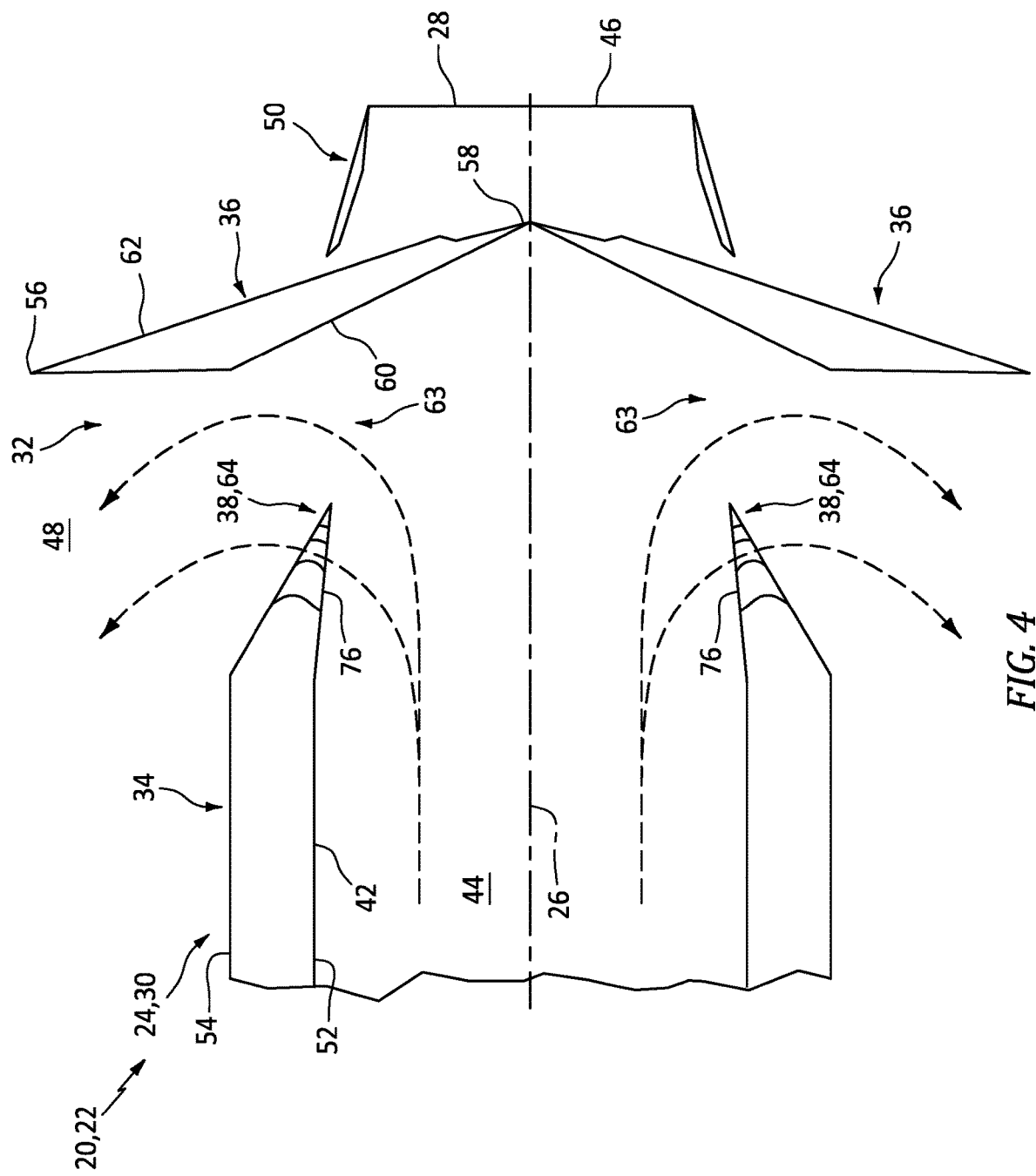
FIG. 4 is a side sectional schematic illustration of the aft section of the aircraft propulsion system of FIG. 3 with its thrust reverser doors deployed.

This thrust reverser door movement uncovers outer sides of the cascade structures 38 and may open one or more jet pipe openings 63, where each jet pipe opening 63 of FIGS. 2 and 4 is formed and/or extends axially between a respective one of the cascade structures 38 and a respective one of the thrust reverser doors 36. The thrust reverser door movement also positions the thrust reverser doors 36 to substantially or completely block access to the exhaust nozzle 46 as well as redirect the gas flowing within the flowpath 44 radially outward and through the cascade structures 38.

Figure 5:
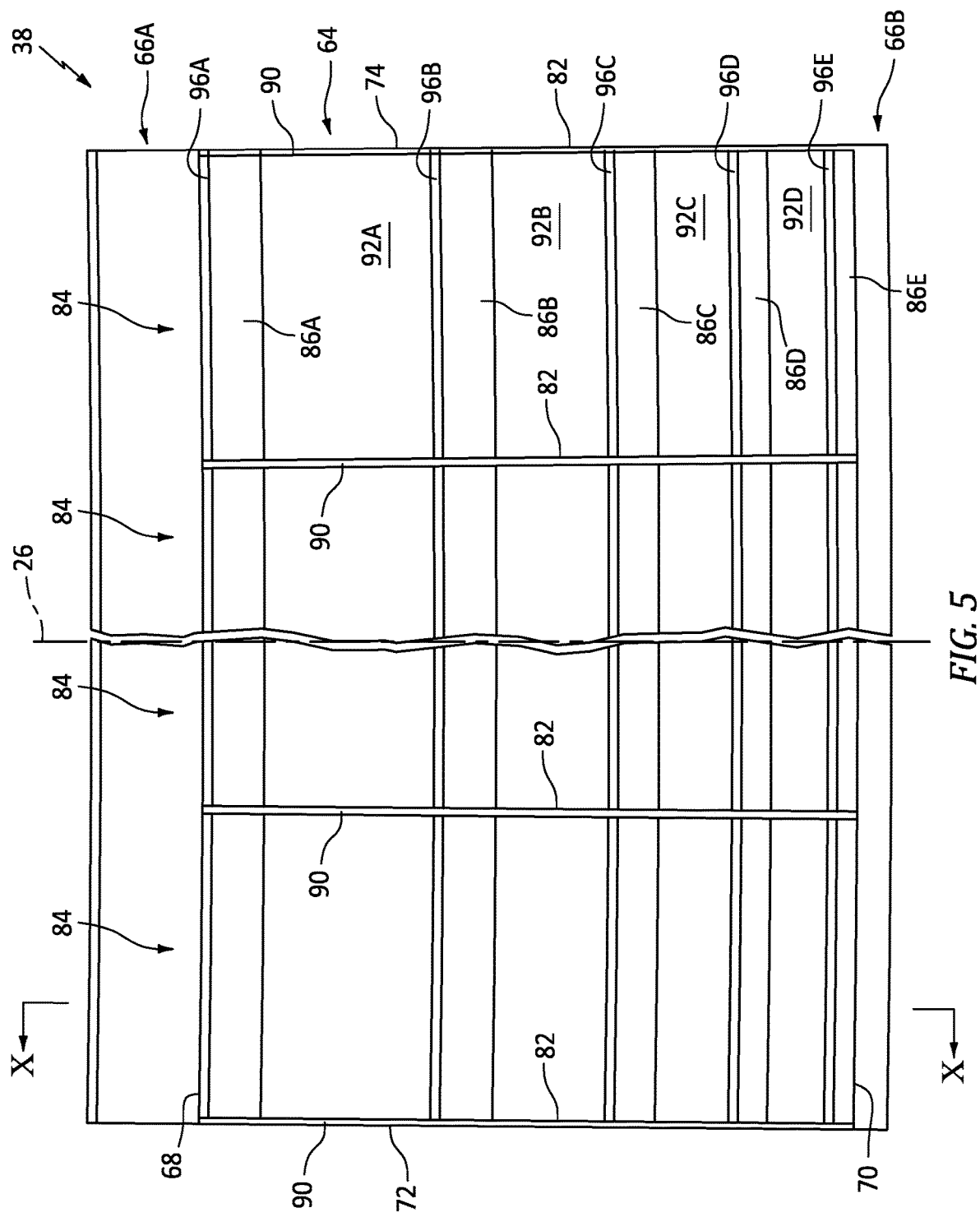
FIG. 5 is a partial illustration of an outer side of a cascade structure.
Figure 6:
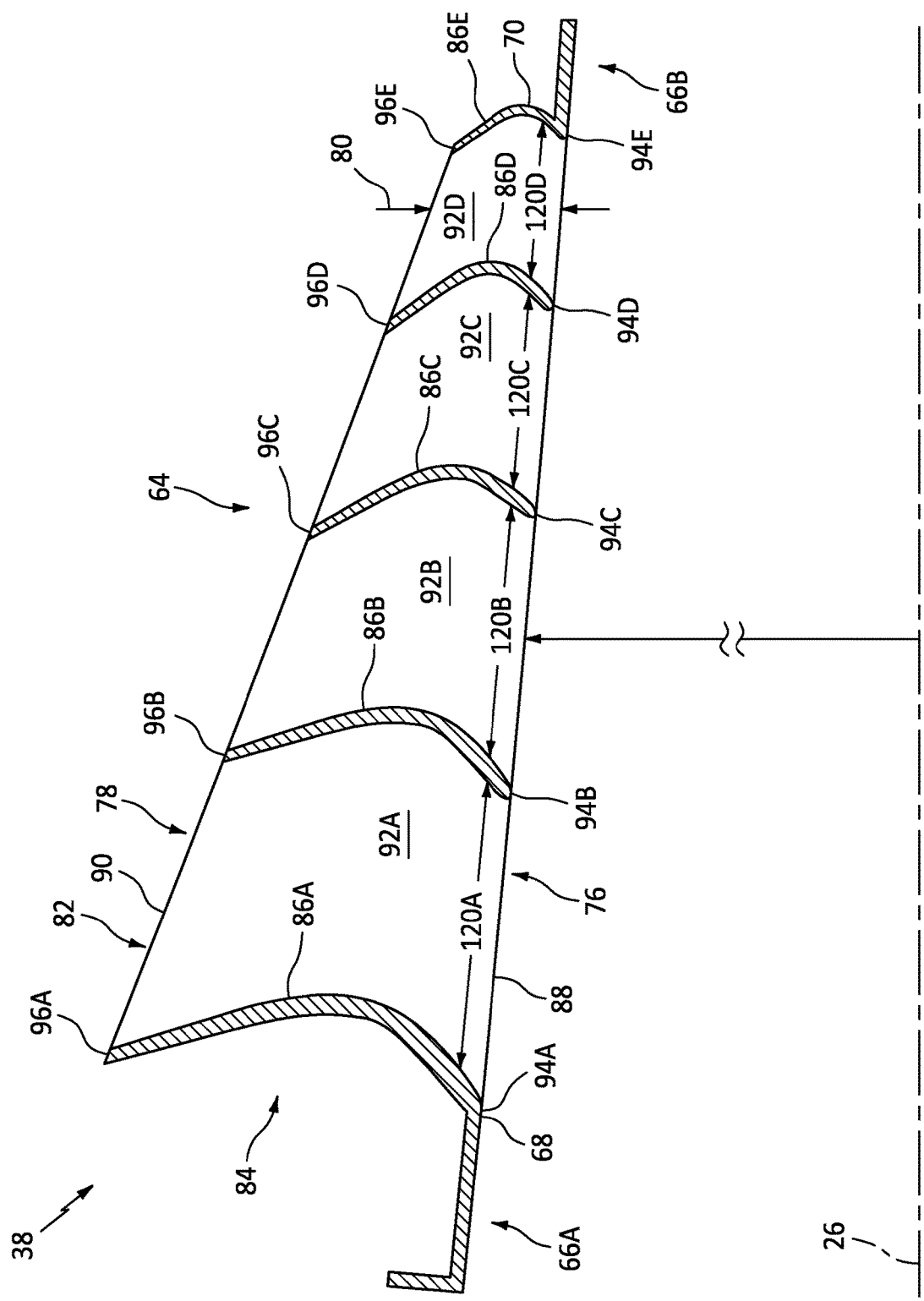
FIG. 6 is a side sectional illustration of the cascade structure of FIG. 5 taken along line X-X, where the cascade structure of FIG. 6 has a first arrangement of cascade vanes.

FIGS. 5 and 6 illustrate an exemplary one of the cascade structures 38. This cascade structure 38 includes a thrust reverser cascade 64 (e.g., a base cascade structure, a cascade basket, etc.) and one or more attachments 66 (e.g., 66A and 66B); e.g., mounting structures.

Figure 3:
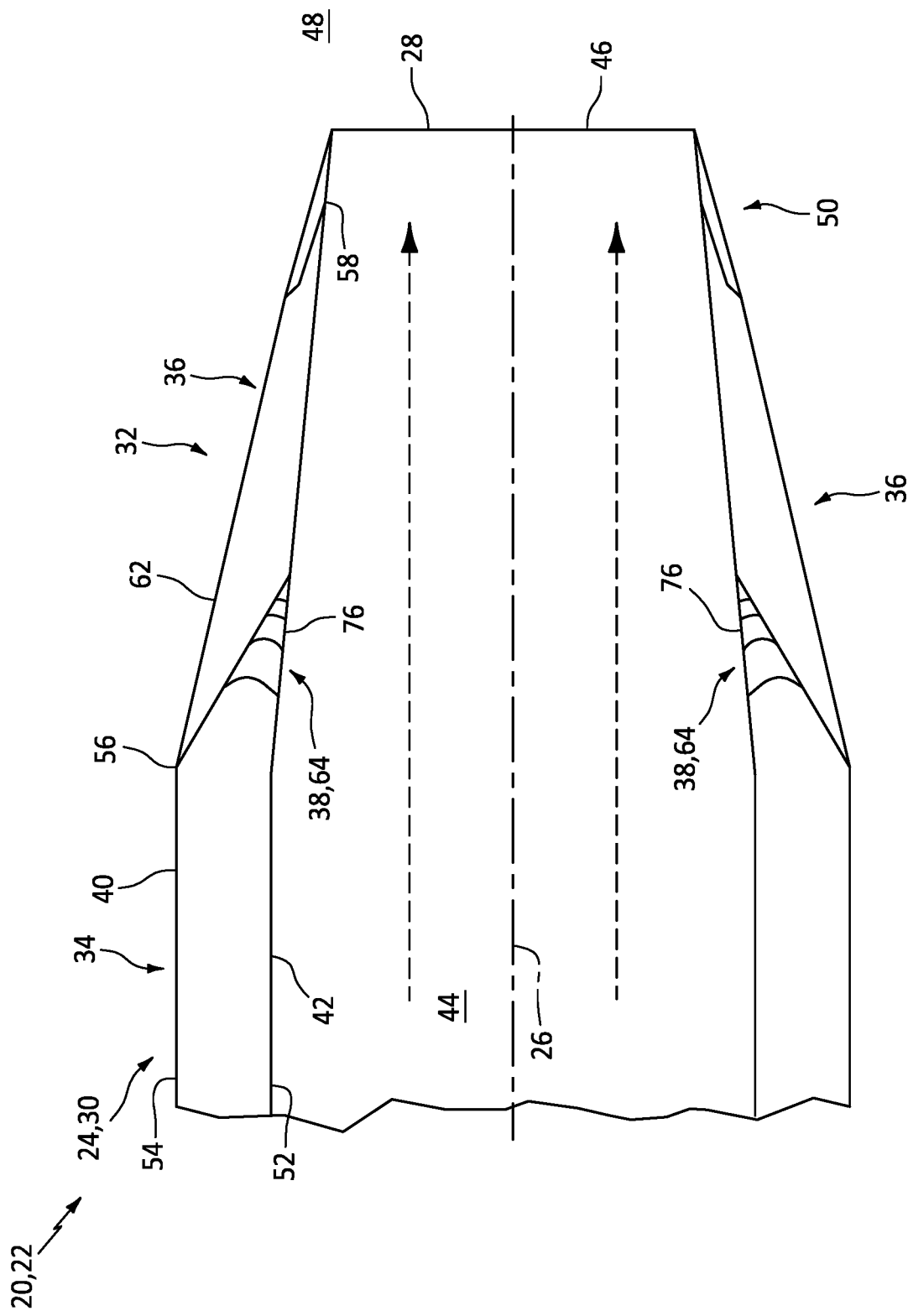
FIG. 3 is a side sectional schematic illustration of an aft section of another aircraft propulsion system with its thrust reverser doors stowed.

The thrust reverser cascade 64 of FIG. 5 extends longitudinally (e.g., axially along the axial centerline 26) between and to a forward end 68 of the thrust reverser cascade 64 and an aft end 70 of the thrust reverser cascade 64. The thrust reverser cascade 64 extends laterally (e.g., circumferentially about the axial centerline 26) between and to a first side 72 of the thrust reverser cascade 64 and a second side 74 of the thrust reverser cascade 64. The thrust reverser cascade 64 of FIG. 6 extends radially relative to the axial centerline 26 between and to an inner face 76 of the cascade structure 38 and its thrust reverser cascade 64 and an outer face 78 of the cascade structure 38 and its thrust reverser cascade 64. Referring to FIGS. 1 and 3, each cascade inner face 76 may follow a contour of the inner aerodynamic flow surface 42 and may bridge a gap between the structure inner side 52 and a respective one of the door inner sides 60. Each cascade inner face 76 of FIGS. 1 and 3 is thereby disposed at and extends axially along the flowpath 44 when the thrust reverser doors 36 are stowed. By contrast, referring to FIGS. 2 and 4, each cascade inner face 76 provides an inlet to the respective cascade structure 38 and its thrust reverser cascade 64 when the thrust reverser doors 36 are deployed.

Referring to FIG. 6, at least a portion or an entirety of the cascade inner face 76 may be angularly offset from at least a portion or an entirety of the cascade outer face 78. With such an arrangement, the thrust reverser cascade 64 may radially taper (e.g., a radial distance 80 between the faces 76 and 78 may decrease) as the thrust reverser cascade 64 extends longitudinally between the cascade ends 68 and 70; e.g., from the cascade forward end 68 to the cascade aft end 70. The cascade inner face 76, however, may alternatively be arranged parallel with the cascade outer face 78 such that the radial distance 80 does not change as the thrust reverser cascade 64 extends longitudinally between the cascade ends 68 and 70.

The thrust reverser cascade 64 may be configured such that a (e.g., arcuate) plane of the cascade inner face 76 has a linear (e.g., straight) sectional geometry when viewed, for example, in a first reference plane parallel with the axial centerline 26. The thrust reverser cascade 64 may also be configured such that a (e.g., arcuate) plane of the cascade outer face 78 has a linear (e.g., straight) sectional geometry when viewed, for example, in the first reference plane. The thrust reverser cascade 64, however, may alternatively be configured to provide the plane of the cascade inner face 76 and/or the plane of the cascade outer face 78 with a non-linear (e.g., curved, bent, etc.) sectional geometry when viewed, for example, in the first reference plane.

Figure 7B:
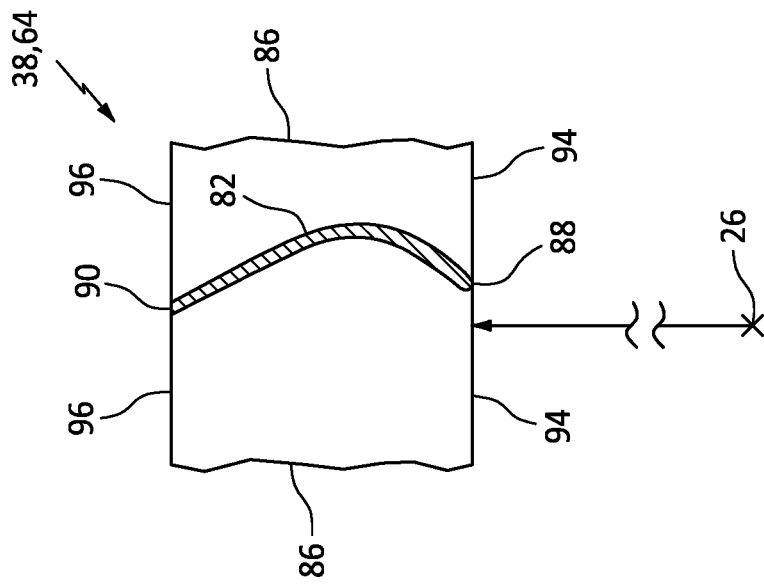
FIGS. 7A and 7B are partial sectional illustrations of a portion of the cascade structure with various arrangements of strongback rail cross-sectional geometries.
Figure 7A:
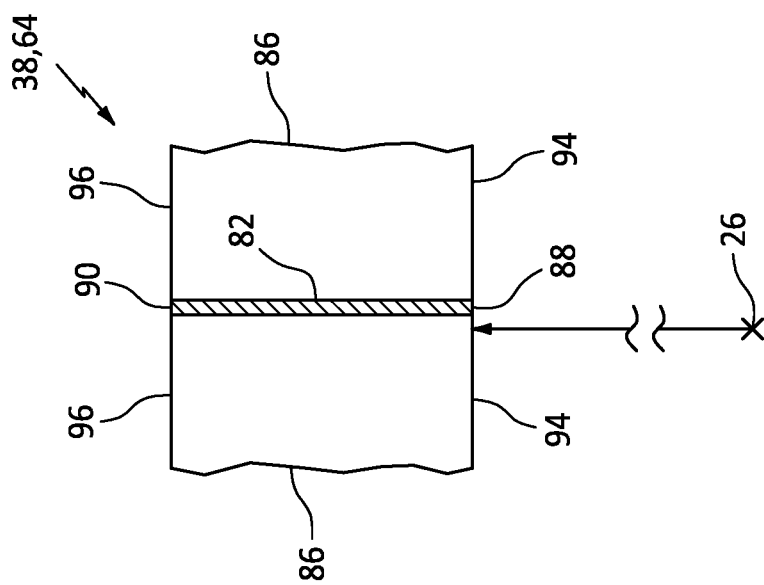

The thrust reverser cascade 64 of FIGS. 5 and 6 includes one or more strongback rails 82 and one or more arrays 84 of cascade vanes 86 (e.g., 86A-E). The strongback rails 82 of FIG. 5 are arranged in parallel with one another. Each of the strongback rails 82 extends longitudinally between and to the cascade forward end 68 and the cascade aft end 70. Each of the strongback rails 82 of FIG. 6 extends radially between and to a leading edge 88 of the respective strongback rail 82 and a trailing edge 90 of the respective strongback rail 82. The rail leading edge 88 may be disposed at (e.g., on, adjacent or proximate), radially aligned with, extend longitudinally along and/or define the plane of the cascade inner face 76. The rail trailing edge 90 may be disposed at, radially aligned with, extend longitudinally along and/or define the plane of the cascade outer face 78. Referring to FIG. 7A, each strongback rail 82 may have a linear (e.g., straight) cross-sectional geometry when viewed, for example, in a second reference plane perpendicular to the axial centerline 26. Alternatively, referring to FIG. 7B, one or more or all of the strongback rails 82 may each have a non-linear (e.g., curved) cross-sectional geometry when viewed, for example, in the second reference plane. With such a configuration, the strongback rails 82 may facilitate directing gas flow through the respective cascade structure 38 in a circumferential direction.

Referring to FIG. 5, each array 84 of the cascade vanes 86 is arranged between a respective laterally neighboring (e.g., adjacent) pair of the strongback rails 82. Each of the cascade vane arrays 84 includes a plurality of the cascade vanes 86. Within each cascade vane array 84, the cascade vanes 86 are disposed at discrete locations along a longitudinal length of the respective strongback rails 82. The forward cascade vane 86A of FIG. 5, for example, is disposed at the cascade forward end 68. This forward cascade vane 86A may form a bullnose and/or a ramp for the cascade vane array 84; see also FIG. 6. The aft cascade vane 86E of FIG. 5 is disposed at the cascade aft end 70. The intermediate cascade vanes 86B, 86C and 86D of FIG. 5 are arranged sequentially longitudinally between the forward cascade vane 86A and the aft cascade vane 86E. With this arrangement, each longitudinally neighboring (e.g., adjacent) pair of the cascade vanes 86 forms a respective channel 92 (e.g., 92A-D) (e.g., gas passage) therebetween.

Each channel 92 of FIG. 5 extends longitudinally within the thrust reverser cascade 64 between and to a respective longitudinally neighboring pair of the cascade vanes 86. Each channel 92 extends laterally within the thrust reverser cascade 64 between and to a respective laterally neighboring pair of the strongback rails 82. Referring to FIG. 6, each channel extends radially through the thrust reverser cascade 64 between an inlet of the respective channel 92 at the cascade inner face 76 and an outlet of the respective channel 92 at the cascade outer face 78.

Referring to FIG. 5, each of the cascade vanes 86 extends laterally between and to the respective laterally neighboring pair of the strongback rails 82. Each of the cascade vanes 86 may be connected to (e.g., formed integral with or bonded to) the respective laterally neighboring pair of the strongback rails 82. Each of the cascade vanes 86 of FIG. 6 extends radially between and to a leading edge 94 (e.g., 94A-E) of the respective cascade vane 86 and a trailing edge 96 (e.g., 96A-E) of the respective cascade vane 86. Radial heights of the cascade vanes 86A-E may vary (e.g., decrease); however, the present disclosure is not limited thereto. The vane leading edge 94 is disposed at (e.g., on, adjacent or proximate) the cascade inner face 76 and, thus, may be radially aligned with (or proximate to) the rail leading edge 88. The vane trailing edge 96 is disposed at (e.g., on, adjacent or proximate) the cascade outer face 78 and, thus, may be radially aligned with (or proximate to) the rail trailing edge 90. Each of the cascade vanes 86 may have a non-linear (e.g., curved) cross-sectional geometry when viewed, for example, in a third reference plane perpendicular to the respective cascade vane 86 and/or parallel with the axial centerline 26. With such a configuration, the cascade vanes 86 may facilitate directing gas flow through the respective cascade structure 38 in an axial direction; e.g., an axially forward direction.

Referring to FIGS. 5 and 6, each of the cascade attachments 66 is configured to attach/mount the respective cascade structure 38 and its thrust reverser cascade 64 to another structure of the aircraft propulsion system 22 such as, but not limited to, a forward torque box and/or an aft support ring. The cascade attachments 66 of FIGS. 5 and 6, for example, are configured as attachment flanges. The forward cascade attachment 66A is disposed at the cascade forward end 68, and is connected (e.g., formed integral with or bonded to) the thrust reverser cascade 64 and its elements 82 and 86A. The forward attachment of FIG. 6 forms a segment of the inner aerodynamic flow surface 42 longitudinally adjacent and upstream of the cascade vane 86A; e.g., the cascade bullnose and/or the cascade ramp. The aft cascade attachment 66B is disposed at the cascade aft end 70, and is connected (e.g., formed integral with or bonded to) the thrust reverser cascade 64 and its elements 82 and 86E. The aft attachment of FIG. 6 forms a segment of the inner aerodynamic flow surface 42 longitudinally adjacent and downstream of the cascade vane 86E.

Figure 8:
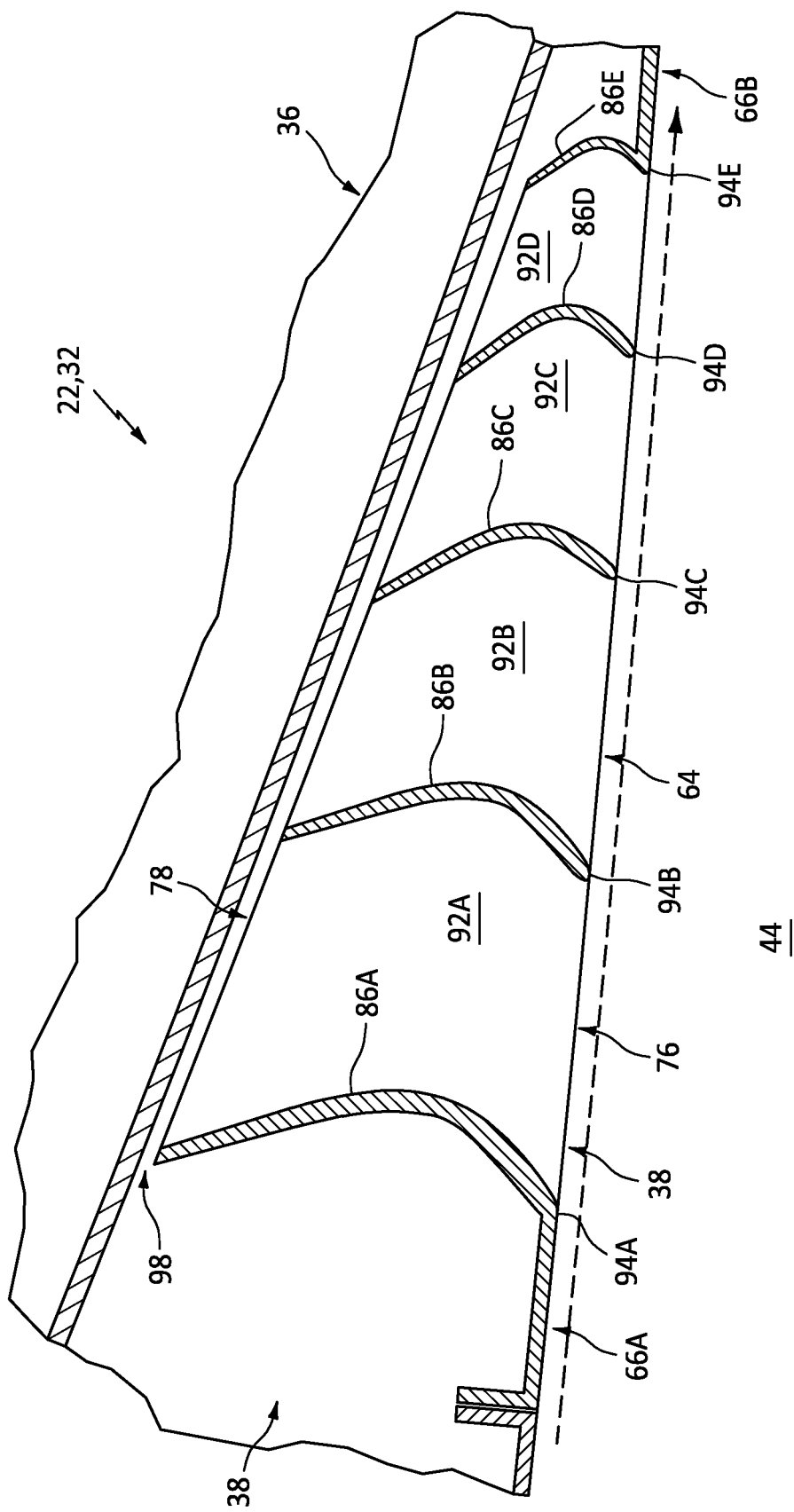
FIG. 8 is a side sectional illustration of a portion of the aircraft propulsion system with the cascade structure of FIG. 6 depicted during forward thrust operation.

Referring to FIG. 8, when the thrust reverser doors 36 are stowed, the gas within the flowpath 44 flows axially along and across each cascade inner face 76 (see also FIGS. 1 and 3). Where each of the vane leading edges 94 is disposed on, radially aligned with, extends laterally along and/or defines the plane of the cascade inner face 76, the gas flow may interact with the respective cascade structure 38 and its cascade vanes 86 and generate an audible sound. For example, the gas flow grazing over the cascade vanes 86 and their vane leading edges 94 may excite an acoustic feedback mechanism from shear layer impingement; e.g., Rossiter modes. This noise may be amplified by volumes (e.g., the channels 92) within the respective cascade structure 38 and/or a closed volume 98 between the respective cascade structure 38 and the overlapping stowed thrust reverser door 36. More particularly, the Rossiter modes may couple with cavity back-volume acoustic modes. This sound may propagate within the aft structure 30 and may increase a noise signature of the aircraft propulsion system 22.

To disrupt, mitigate and/or prevent the sound generated by the flow of gas across the cascade structures 38, one or more or all of the cascade structures 38 may each be configured with one or more flow disruptors 100 (e.g., grooves, protrusions, etc.) at the respective cascade inner face 76 and/or the inner aerodynamic flow surface 42. Exemplary flow disruptors 100 are shown in FIGS. 9 and 10.

Figure 9:
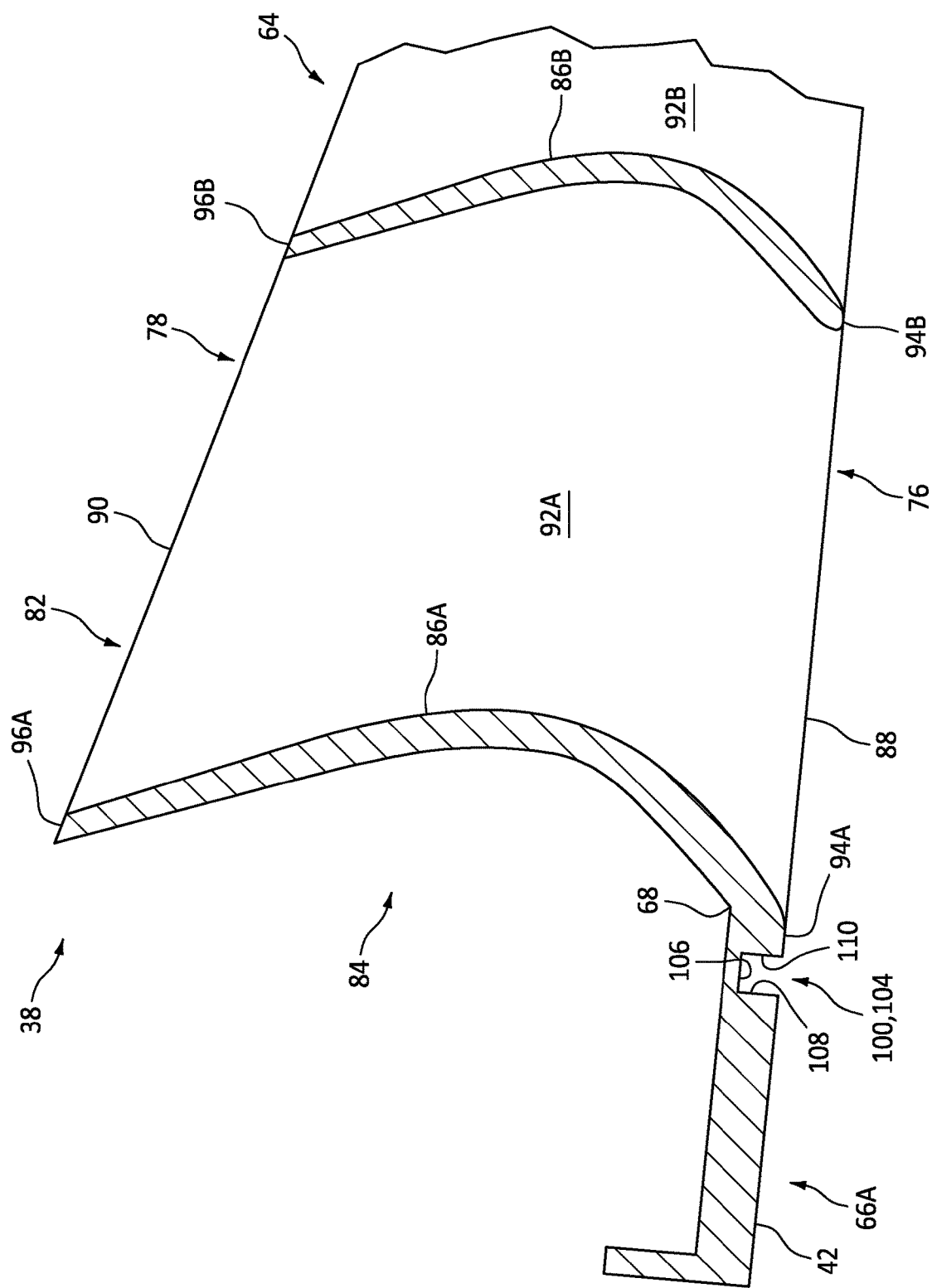
FIGS. 9 and 10 are partial side sectional illustrations of the cascade structure with various flow disruptor arrangements.
Figure 10:
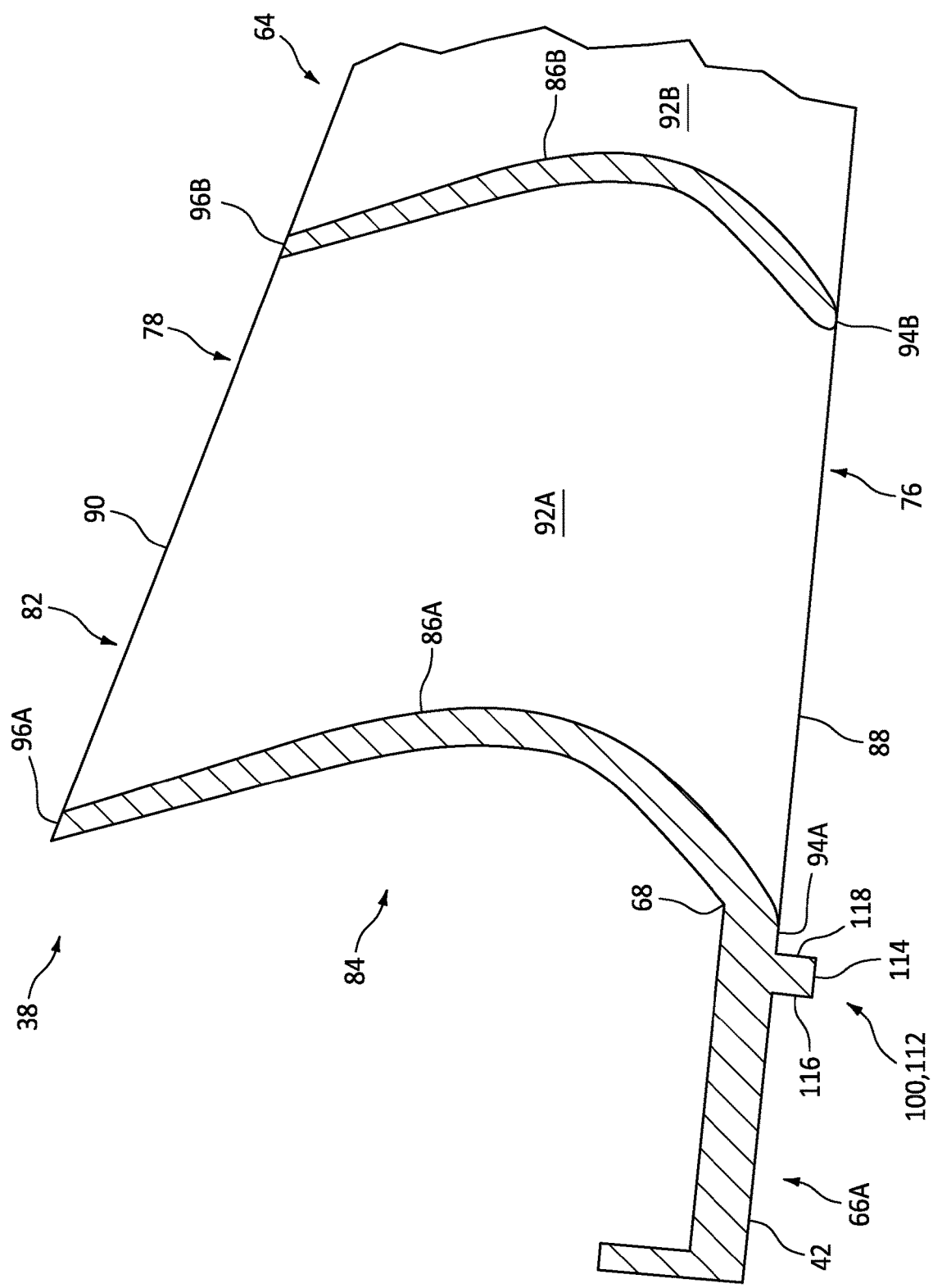

Each flow disruptor 100 of FIGS. 9 and 10 is configured to trip, disturb, restart and/or otherwise disrupt boundary layer air flowing along the inner aerodynamic flow surface 42 (see also FIGS. 1 and 3) towards the respective thrust reverser cascade 64 and its cascade vanes 86 and cascade channels 92. By disrupting the boundary layer air with the flow disruptor 100, the boundary layer airflow may be diverted slightly radially away from the cascade inner face 76. The boundary layer airflow may thereby be less likely to interact with the cascade vanes 86 and their vane leading edges 94 to excite the acoustic feedback mechanism from shear layer impingement. The flow disruptors 100 may therefore facilitate attenuation of the Rossiter modes. Attenuating the Rossiter modes may also reduce or prevent excitation of the cavity back-volume acoustic modes. Where the flow disruptor 100 is a groove, the boundary layer near-wall flow behavior may be changed, affecting the shear layer formation leaving the groove at 94A and its development. The flow traveling over the cascade channel 92A may then be less likely to form acoustic feedback mechanisms due to reduced shear layer sensitivity to acoustic disturbances so that Rossiter modes cannot be formed effectively.

Each flow disruptor 100 of FIGS. 9 and 10 is disposed longitudinally forward of the thrust reverser cascade 64 and its cascade vanes 86. Each flow disruptor 100, for example, may be disposed at (e.g., on, adjacent or proximate) the cascade forward end 68. More particularly, each flow disruptor 100 may be disposed at the vane leading edge 94A of the cascade vane 86A; here, the cascade bullnose and/or the cascade ramp into the thrust reverser cascade 64.

Figure 11A:
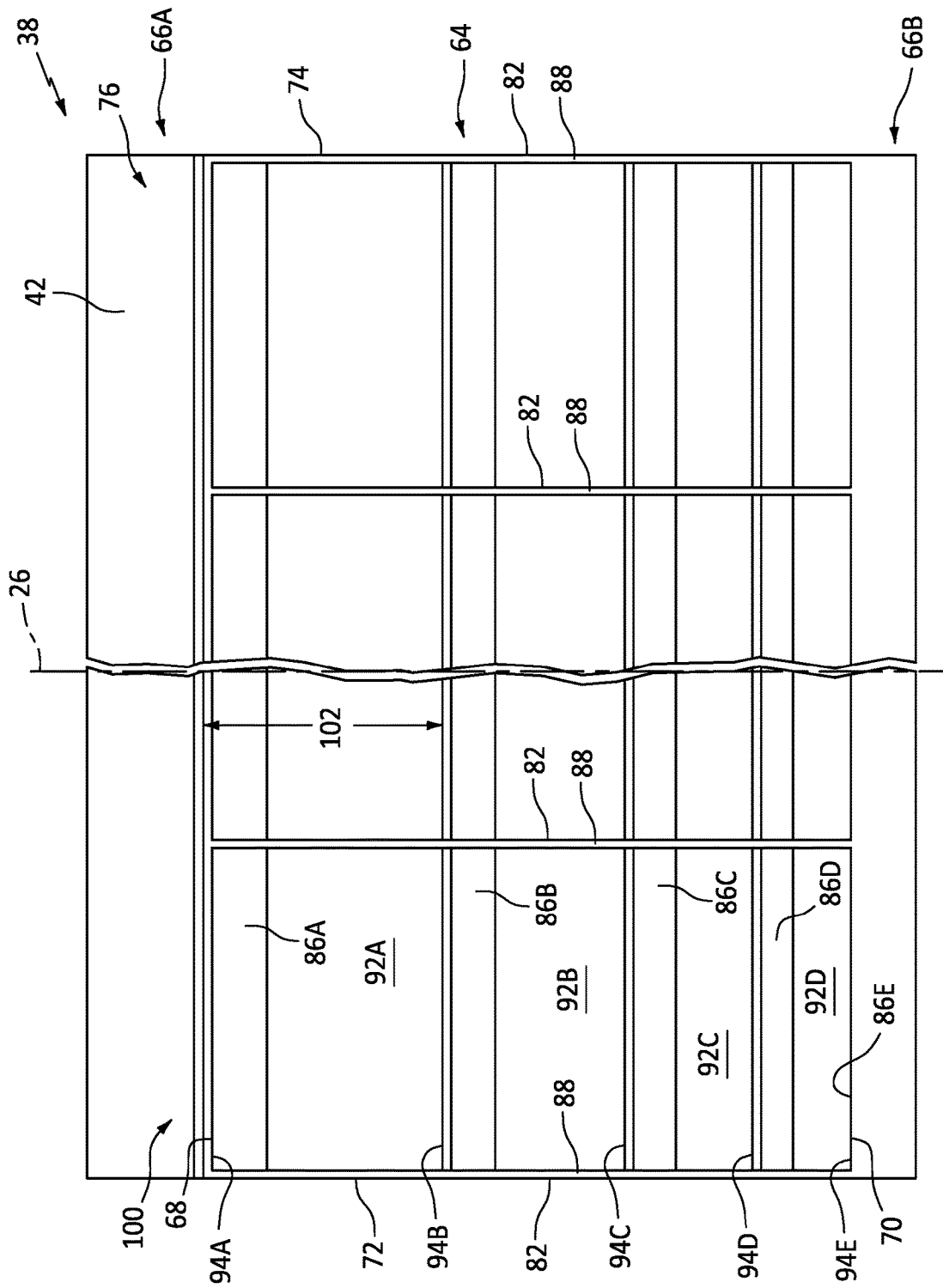
FIGS. 11A and 11B are a partial illustrations of an inner side of the cascade structure with various flow disruptor arrangements.
Figure 11B:
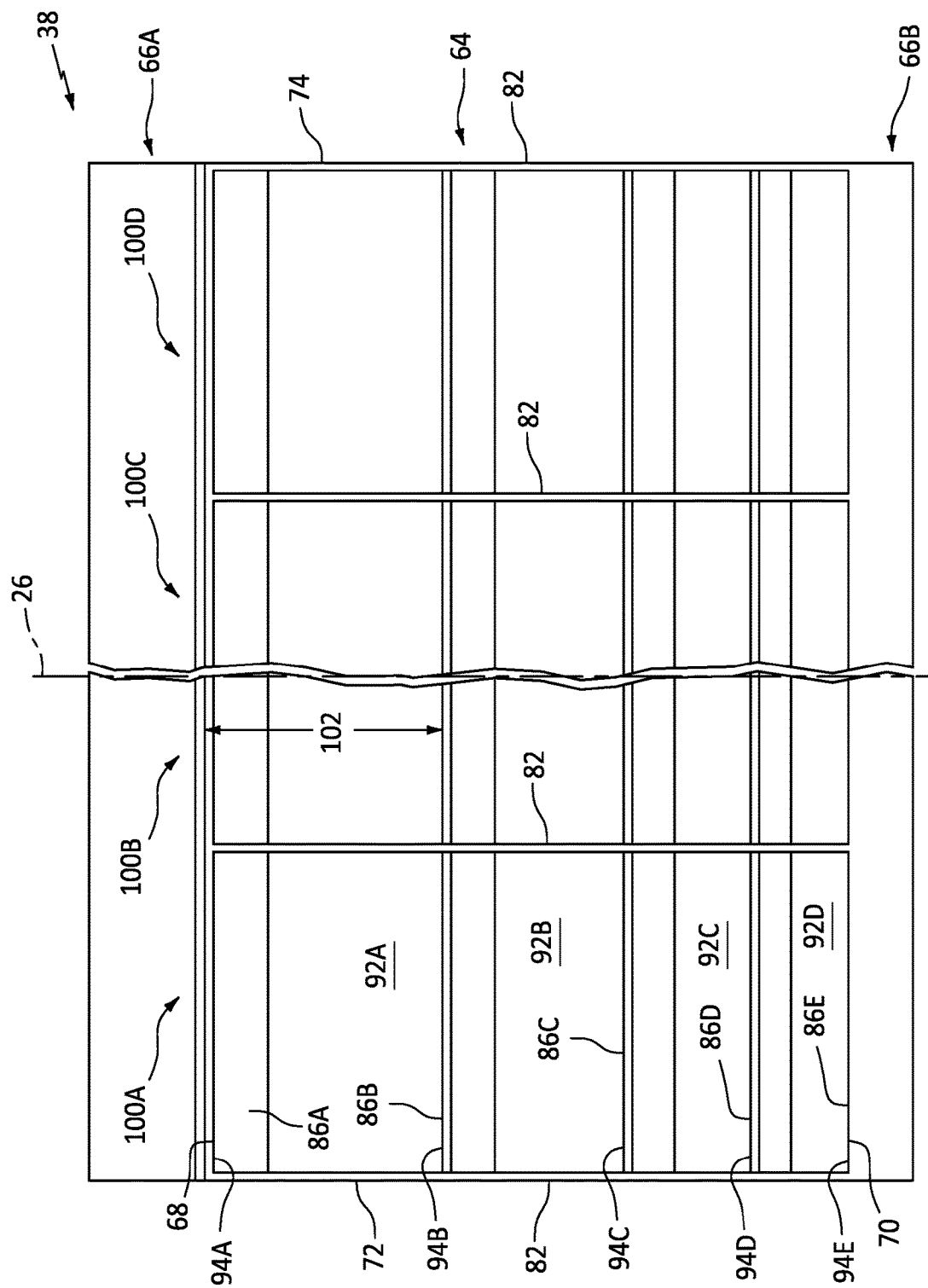

Referring to FIGS. 11A and 11B, each flow disruptor 100 extends laterally along the thrust reverser cascade 64. The flow disruptor 100 of FIG. 11A, for example, extends laterally along an entire lateral length of the thrust reverser cascade 64 between the cascade first side 72 and the cascade second side 74. Alternatively, referring to FIG. 11B, multiple flow disruptors 100 (e.g., 100A-D) may extend laterally along the thrust reverser cascade 64 (e.g., in an end-to-end arrangement) between the cascade first side 72 and the cascade second side 74. The flow disruptor 100A FIG. 11B, for example, extends laterally along a first segment of the thrust reverser cascade 64. The flow disruptor 100B is positioned laterally next to the flow disruptor 100A, and the flow disruptor 100B extends laterally along a second segment of the thrust reverser cascade 64. Here, each flow disruptor 100 extends laterally along an entire lateral length of a respective array of the cascade vanes 86; however, the present disclosure is not limited thereto.

Figure 12:
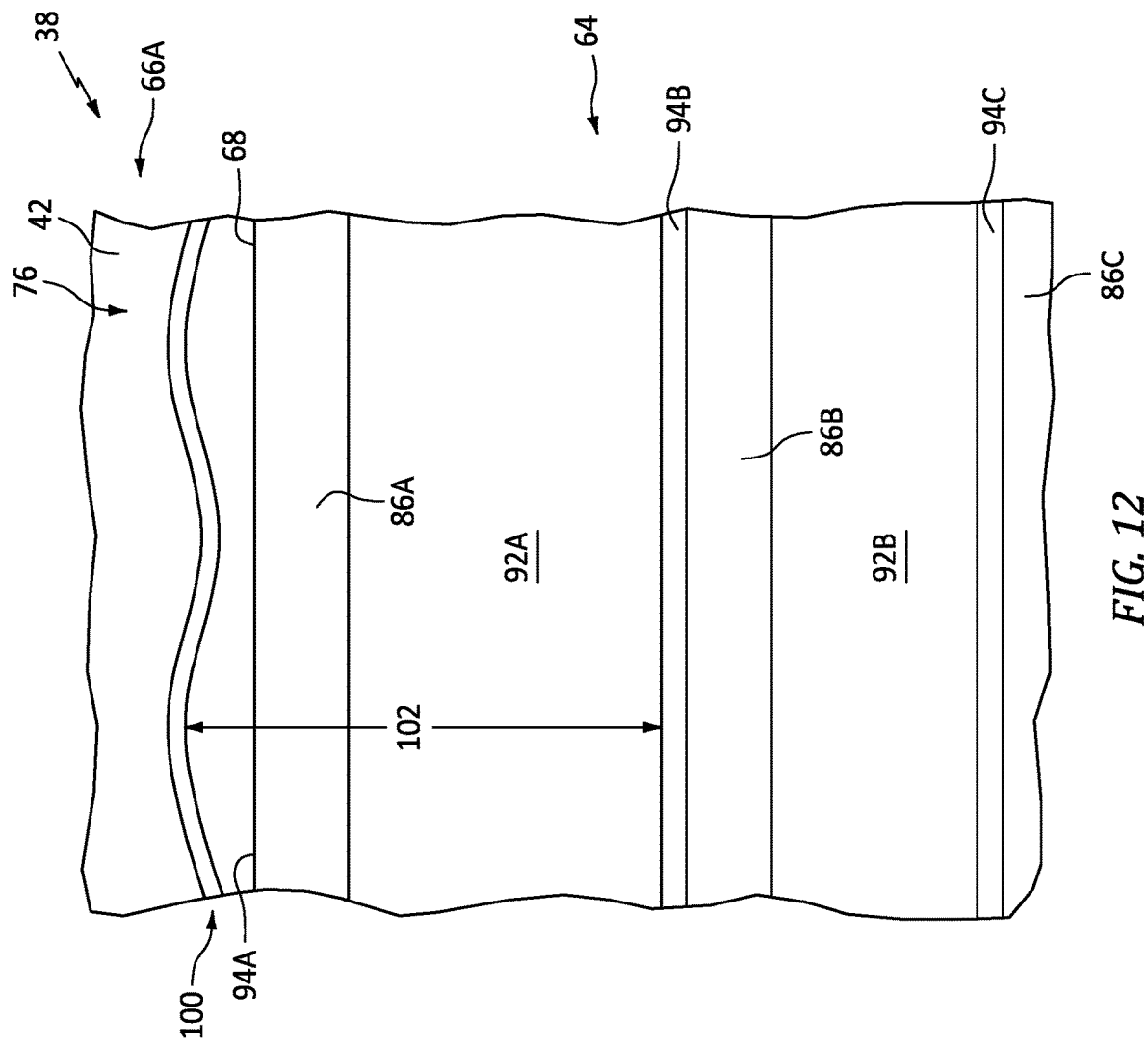
FIG. 12 is a partial illustration of the inner side of the cascade structure with another flow disruptor arrangement.

In some embodiments, referring to FIGS. 11A and 11B, a longitudinal distance 102 between each flow disruptor 100 and the cascade vane 86B and its vane leading edge 94B may be constant as at least a portion or an entirety of that flow disruptor 100 extends laterally along the thrust reverser cascade 64. In other embodiments, referring to FIG. 12, the longitudinal distance 102 may change (e.g., increase and/or decrease) as at least a portion or an entirety of the respective flow disruptor 100 extends laterally along the thrust reverser cascade 64. The flow disruptor 100 of FIG. 12, for example, may follow a wavy or otherwise non-straight (e.g., zig-zag, curved, etc.) laterally extending trajectory.

In some embodiments, referring to FIG. 9, each flow disruptor 100 may be configured as or otherwise include a groove 104. This groove 104 extends radially into the cascade structure 38 from the cascade inner face 76 and/or the inner aerodynamic flow surface 42 to a groove end surface 106. The groove 104 extends longitudinally within the cascade structure 38 between and to opposing longitudinal sides 108 and 110 of the groove 104. The groove 104 has a cross-sectional geometry when viewed in the first and/or the third reference plane; e.g., the plane of FIG. 9. This cross-sectional geometry may have a polygonal shape such as, but not limited to, a square, a rectangle, a triangle or a trapezoid. The groove 104 of the present disclosure, however, is not limited to such an exemplary polygonal cross-sectional geometry. The cross-sectional geometry, for example, may alternatively be a circular or elliptical segment.

In some embodiments, referring to FIG. 10, each flow disruptor 100 may be configured as or otherwise include a protrusion 112; e.g., a fence. This protrusion 112 extends radially out from the cascade inner face 76 and/or the inner aerodynamic flow surface 42 to a (e.g., unsupported) distal end 114 of the protrusion 112. The protrusion 112 extends longitudinally between and to opposing longitudinal sides 116 and 118 of the protrusion 112. The protrusion 112 has a cross-sectional geometry when viewed in the first and/or the third reference plane; e.g., the plane of FIG. 10. This cross-sectional geometry may have a polygonal shape such as, but not limited to, a square, a rectangle, a triangle or a trapezoid. The protrusion 112 of the present disclosure, however, is not limited to such an exemplary polygonal cross-sectional geometry. The cross-sectional geometry, for example, may alternatively be a circular or elliptical segment.

In some embodiments, referring to FIG. 6, some or all of the cascade vanes 86 may be differentially spaced. A longitudinal distance 120A between the cascade vanes 86A and 86B at their leading edges 94A and 94B, for example, may be different (e.g., greater) than a longitudinal distance 120B between the cascade vanes 86B and 86C at their leading edges 94B and 94C. The longitudinal distance 120B may be different (e.g., greater) than a longitudinal distance 120C between the cascade vanes 86C and 86D at their leading edges 94C and 94D. The longitudinal distance 120C may be different (e.g., greater) than a longitudinal distance 120D between the cascade vanes 86D and 86E at their leading edges 94D and 94E. Of course, in other embodiments, some or all of the longitudinal distances 120A-D may be equal.

In some embodiments, referring to FIG. 13, one or more of the thrust reverser doors 36 may each include a kicker frame 122 at the door forward end 56. This kicker frame 122 may meet a ramp surface 124 of the respective thrust reverser doors 36. The ramp surface 124 directs air passing radially outward through the thrust reverser system 32 when deployed to the kicker frame 122. The kicker frame 122 redirects the air in an axially forward direction.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An apparatus for an aircraft propulsion system, comprising:
   a propulsion system structure including a flowpath and a pivoting door thrust reverser system;
   the flowpath extending within the propulsion system structure to an exhaust nozzle;
   the pivoting door thrust reverser system including a cascade structure and a thrust reverser door;
   the cascade structure including a thrust reverser cascade and a flow disruptor;
   the thrust reverser cascade extending longitudinally between a cascade forward end and a cascade aft end, the thrust reverser cascade extending laterally between a cascade first side and a cascade second side, the thrust reverser cascade extending radially between an inner face and an outer face, and the thrust reverser cascade comprising a plurality of vanes arranged in a longitudinally extending array along the inner face;
   the flow disruptor arranged at an inner aerodynamic flow surface of the inner face and forward of a bullnose for the plurality of vanes, the inner aerodynamic flow surface extending axially toward the cascade forward end, and the flow disruptor configured to disrupt boundary layer air flowing towards the plurality of vanes; and
   the thrust reverser door configured to pivot outward into an environment external to the aircraft propulsion system and open an opening through the pivoting door thrust reverser system, and the thrust reverser door further configured to pivot inward into the flowpath to block the exhaust nozzle.

2. The apparatus of claim 1, wherein the flow disruptor comprises a groove that extends radially into the cascade structure from the inner face.

3. The apparatus of claim 1, wherein the flow disruptor comprises a protrusion that extends radially out from the inner face to a distal end.

4. The apparatus of claim 1, wherein the flow disruptor is disposed at a leading edge of a ramp into the thrust reverser cascade.

5. The apparatus of claim 1, wherein the flow disruptor is disposed at the cascade forward end.

6. The apparatus of claim 1, wherein the flow disruptor extends laterally along the thrust reverser cascade.

7. The apparatus of claim 1, wherein
   the cascade structure further includes a second flow disruptor; and
   the second flow disruptor is arranged at the inner face, forward of the plurality of vanes and laterally adjacent the flow disruptor.

8. The apparatus of claim 1, wherein a longitudinal distance between the flow disruptor and a first of the plurality of vanes is constant as the flow disruptor extends laterally along the thrust reverser cascade.

9. The apparatus of claim 1, wherein a longitudinal distance between the flow disruptor and a first of the plurality of vanes changes as the flow disruptor extends laterally along the thrust reverser cascade.

10. The apparatus of claim 1, wherein
    the plurality of vanes include a first vane, a second vane and a third vane;
    the first vane is longitudinally spaced from the second vane by a first distance; and
    the second vane is longitudinally between and neighbors the first vane and the third vane, and the second vane is longitudinally spaced from the third vane by a second distance that is different than the first distance.

11. The apparatus of claim 10, wherein
    the first vane is forward of the second vane;
    the third vane is aft of the second vane; and
    the second distance is less than the first distance.

12. The apparatus of claim 1, wherein the inner face is angularly offset from the outer face.

13. The apparatus of claim 1, wherein the thrust reverser cascade radially tapers as the thrust reverser cascade extends longitudinally between the cascade forward end and the cascade aft end.

14. The apparatus of claim 1, wherein the thrust reverser cascade is exposed to the flowpath when the pivoting door thrust reverser system is stowed.

15. The apparatus of claim 1, wherein
    the thrust reverser door is configured to pivot outward from a stowed position into the environment external and to a deployed position; and a first portion of the thrust reverser door is radially outboard of and axially overlaps the thrust reverser cascade when the thrust reverser door is in the stowed position.

16. An apparatus for an aircraft propulsion system, comprising:

a propulsion system structure including a flowpath and a thrust reverser system;

the flowpath extending within the propulsion system structure to an exhaust nozzle;

the thrust reverser system comprising a cascade structure and a thrust reverser door;

the cascade structure including a thrust reverser cascade and a groove;

the thrust reverser cascade extending longitudinally between a cascade forward end and a cascade aft end, the thrust reverser cascade extending laterally between a cascade first side and a cascade second side, the thrust reverser cascade extending radially between an inner face and an outer face, the thrust reverser cascade comprising a plurality of vanes distributed along the inner face, and the plurality of vanes exposed to the flowpath when the thrust reverser door is in a stowed position;

the groove disposed forward of a ramp for the plurality of vanes, the groove extending radially into the cascade structure from the inner face, and the groove disposed at an axially extending portion of the cascade forward end; and the thrust reverser door configured to pivot between the stowed position and a deployed position, a first portion of the thrust reverser door radially outboard of and axially covering the thrust reverser cascade when the thrust reverser door is in the stowed position, and a second portion of the thrust reverser door forming a radial outer peripheral boundary of the flowpath between the thrust reverser cascade and the exhaust nozzle when the thrust reverser door is in the stowed position.

17. The apparatus of claim 16, wherein the groove extends laterally along an entire lateral length of the thrust reverser cascade.

18. The apparatus of claim 16, wherein the groove is configured with a polygonal cross-sectional geometry.

19. An apparatus for an aircraft propulsion system, comprising:

a propulsion system structure including a flowpath and a thrust reverser system;

the flowpath extending within the propulsion system structure to an exhaust nozzle;

the thrust reverser system comprising a cascade structure and a thrust reverser door;

the cascade structure including a thrust reverser cascade and a fence;

the thrust reverser cascade extending longitudinally between a cascade forward end and a cascade aft end, the thrust reverser cascade extending laterally between a cascade first side and a cascade second side, the thrust reverser cascade extending radially between an inner face and an outer face, the thrust reverser cascade comprising a plurality of vanes distributed along the inner face, and the plurality of vanes exposed to the flowpath when the thrust reverser door is in a stowed position;

the fence disposed at an axially extending portion of the cascade forward end, the fence disposed forward of a bullnose for the plurality of vanes, the fence extending radially out from the inner face to a distal end, and the fence extending laterally along the thrust reverser cascade; and the thrust reverser door configured to pivot between the stowed position and a deployed position, a first portion of the thrust reverser door radially outboard of and axially covering the thrust reverser cascade when the thrust reverser door is in the stowed position, and a second portion of the thrust reverser door forming a radial outer peripheral boundary of the flowpath between the thrust reverser cascade and the exhaust nozzle when the thrust reverser door is in the stowed position.

\* \* \* \* \*